(No Model.)  4 Sheets—Sheet 1.
F. P. FOWLER.
HAY PRESS.

No. 507,425. Patented Oct. 24, 1893.

Witnesses
John Janivie
Geo. F. Kincaid

Inventor
Frank P. Fowler
by John Wedderburn
his Attorney

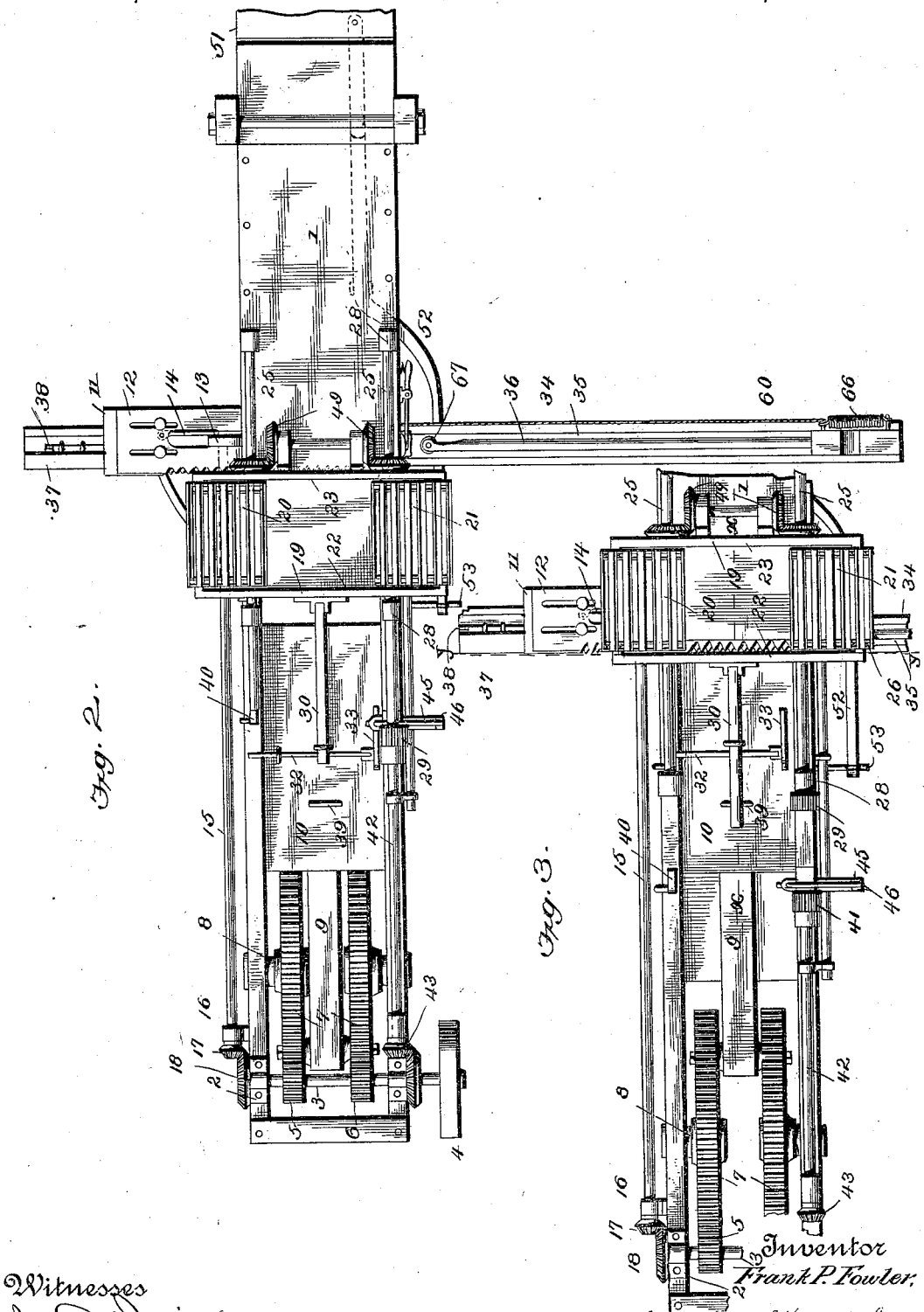

(No Model.) 4 Sheets—Sheet 3.

F. P. FOWLER.
HAY PRESS.

No. 507,425. Patented Oct. 24, 1893.

Witnesses
John Sinivie
Geo. F. Kincaid

Inventor
Frank P. Fowler,
by John Wedderburn
his Attorney (No Model.) 4 Sheets—Sheet 4.
F. P. FOWLER.
HAY PRESS.
No. 507,425. Patented Oct. 24, 1893.
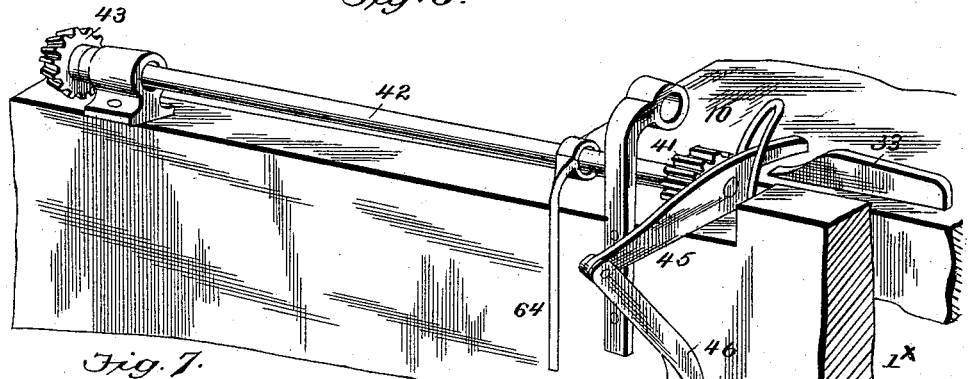
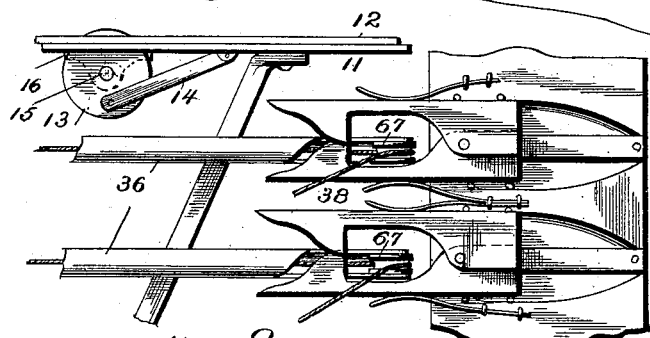
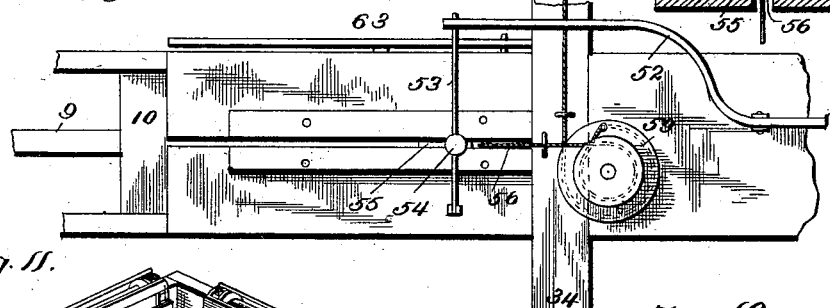
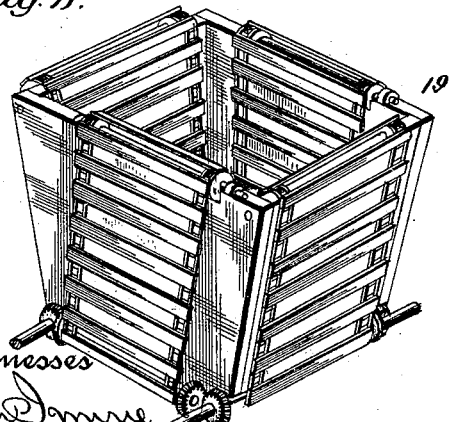
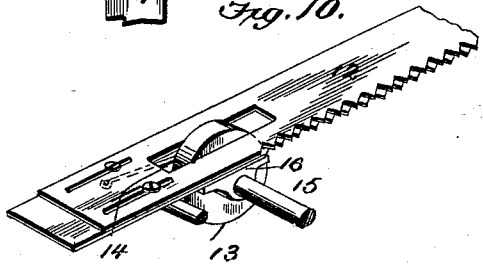
Witnesses
John Jamue
Geo. F. Kincaid
Inventor
Frank P. Fowler
by John Wedderburn
his Attorney.

UNITED STATES PATENT OFFICE.

FRANK P. FOWLER, OF PHŒNIX, ARIZONA TERRITORY.

HAY-PRESS.

SPECIFICATION forming part of Letters Patent No. 507,425, dated October 24, 1893.

Application filed December 19, 1892. Serial No. 455,600. (No model.)

*To all whom it may concern:*

Be it known that I, FRANK P. FOWLER, of Phœnix, in the county of Maricopa and Territory of Arizona, have invented certain new and useful Improvements in Continuous Hay-Presses; and I do hereby declare the following to be a full, clear, and exact description of the invention, such as will enable others skilled in the art to which it appertains to make and use the same.

My invention is an improvement in that class of machines used for compressing hay, straw and similar materials into the form of bales, and to secure same by means of cord or wire, thus preserving the form of the bales, and it has for its object to provide a device of this class which shall possess superior advantages in point of simplicity of construction, as well as inexpensiveness, general efficiency and capacity.

A further object of my invention is to supply a press which shall be continuous in its operation and at the same time obviate the necessity of using blocks between the bales, as is required in other forms of presses of this class.

A further object of my invention is to supply novel means for evenly severing at the predetermined moment that part of the hay or straw in the feeder from that in the bale chamber.

A further object of my invention is to supply simple and novel means for evenly feeding the hay or straw into the baling chamber, and means for arresting the motion of the working parts of said feeder, during the operation of compression in the bale chamber.

Other objects and advantages of the invention will appear in the following description, in which I have set forth fully the details of construction and the essential features thereof and illustrated them in the accompanying drawings, in which similar figures of reference designate corresponding parts.

Figure 1:
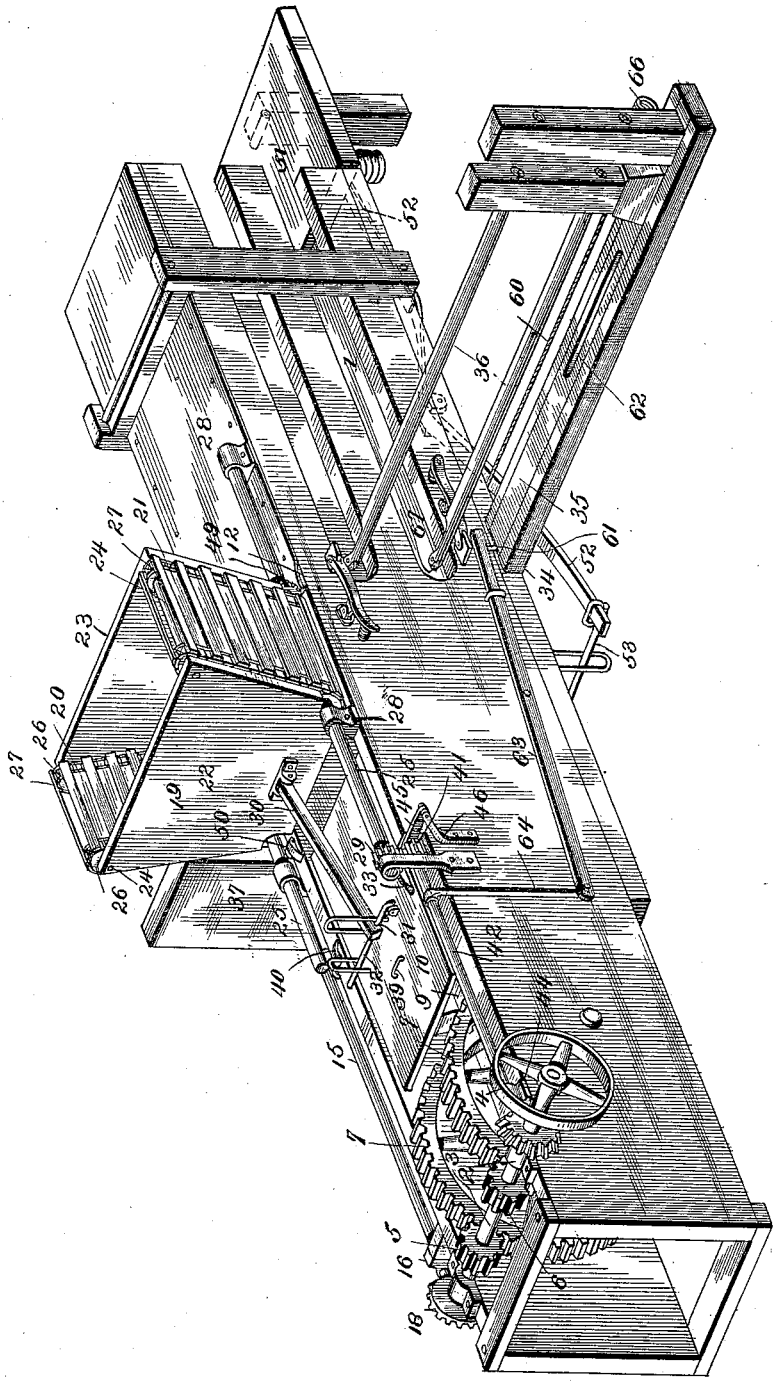
Figure 4:
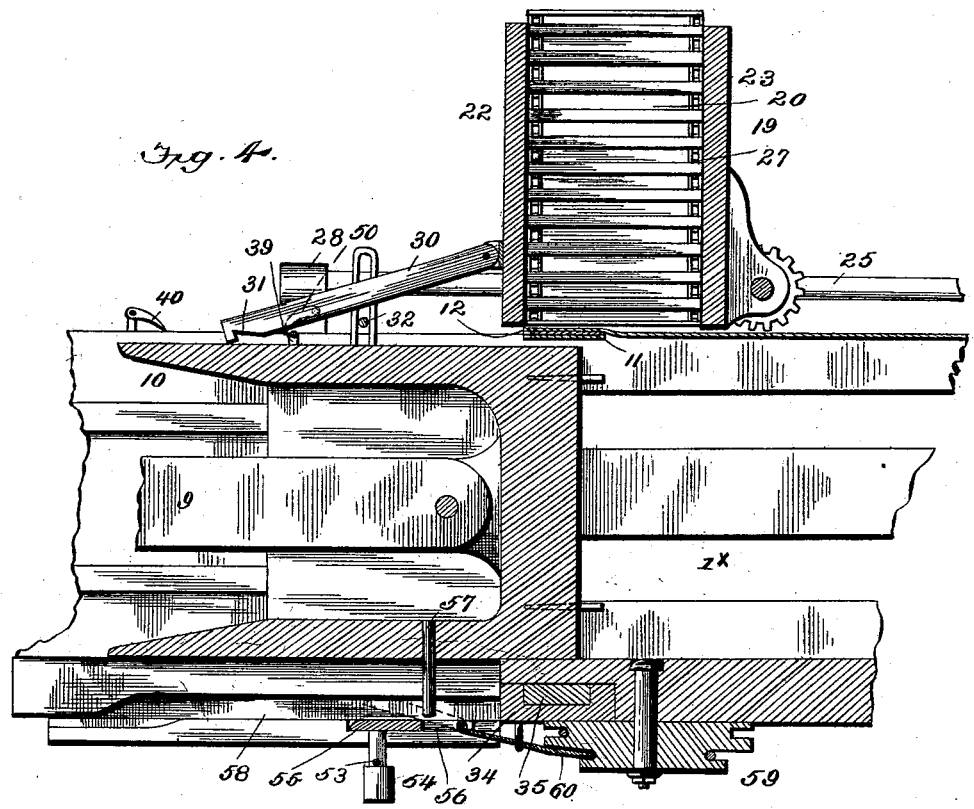
Figure 5:
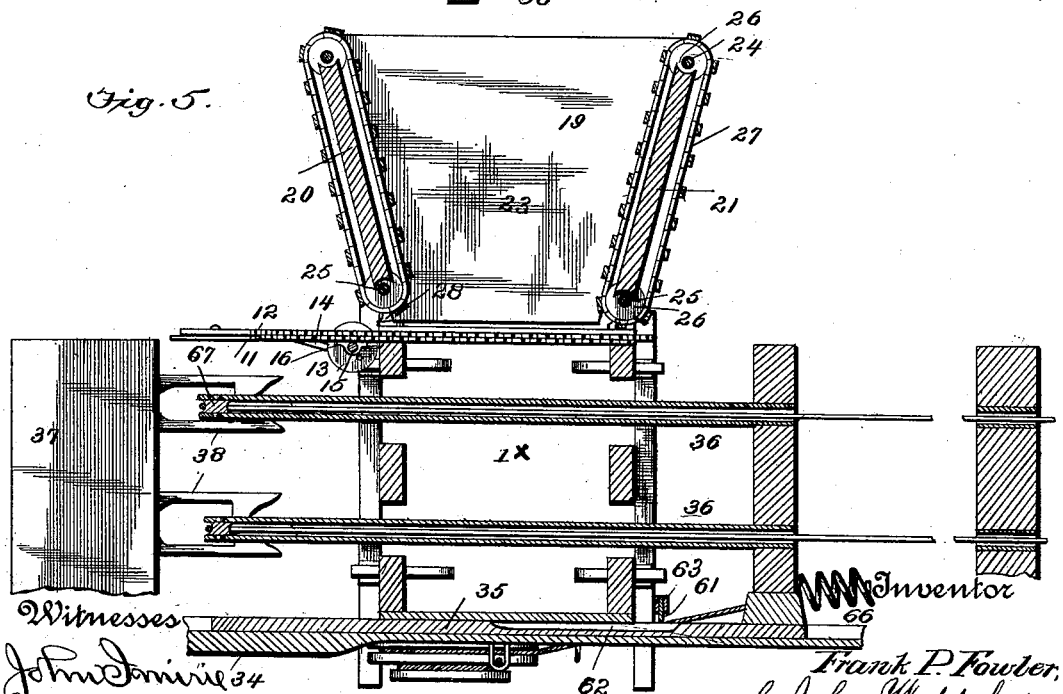

Figure 1 is a perspective view of my improved continuous press. Fig. 2 is a plan view of the press showing the position of the traveling feeder before the bale is compressed. Fig. 3 is a plan view of the press showing the position of the traveling feeder after the bale is compressed. Fig. 4 represents a section through the line $x\,x$ Fig. 3. Fig. 5 represents a section through the line $y\,y$ Fig. 3. Figs. 6, 7, 8, 9, and 10 are detail views, and Figs. 11 and 12 are modifications.

There are various forms which this device may take on and still be within the spirit of my invention, and I therefore do not desire to confine myself to the exact construction and location of parts herein shown and described.

Reference being had to the above figures, 1 represents the body of the machine which is of oblong rectangular form, to which are secured the various parts which contribute to make up the complete press.

Situated in a horizontal position at one end of the body 1, and secured to it by means of the bearings 2 is the shaft 3, to one end of which is the power belt wheel 4. Midway of its length shaft 3 carries small gear wheels 5 and 6, the teeth of which mesh with those of the large power wheels 7 which are mounted in the body as shown. By means of the short connecting bar or shaft 8, the wheels 7 are converted into a crank, to which is secured the outer end of the horizontal plunger rod 9, to the other end of which is pivotally secured the plunger head 10. By means of a belt running over the periphery of the wheel 4, any suitable motive power is communicated directly to the power shaft 3 and by means of the gears 5 and 6 to the plunger shaft and plunger, thereby causing the latter to have a reciprocating motion, the object of which will be hereinafter fully set forth.

Extending transversely across the feed opening in the upper portion of the body 1 is rigidly secured the rectangular guard plate 11, and immediately above plate 11 is situated the reciprocating serrated sickle or cutter 12 to which is imparted the desired motion by means of the crank wheel 13 and connecting rod 14, the wheel 13 being situated at the end of the horizontal shaft 15 which has bearings 16 secured to the guard plate 11 and body 1, and is connected to the power shaft 3 by means of the bevel gears 17 and 18, the speed of reciprocation of the sickle 12 being dependent on the relative diameters of the bevel gears 17 and 18.

I have devised the above means of causing the sickle to reciprocate, as practical and simple, but I am aware that the substitution of any one of many improved forms of mechanism can accomplish the desired result.

Situated on the upper surface of the body 1, and in a vertical position is the hopper 19, which in combination with the working parts thereof, for convenience, may be hereinafter designated the "feeder."

20, 21, 22, and 23 designate the sides of the hopper 19, into which and by means of which the hay or straw is fed into a compressor chamber $1^x$. Having bearings in the upper and lower extremities of the sides 22 and 23 and extending across the end of the sides 20 and 21 are the horizontal shafts 24 and 25 to which are rigidly secured the sprocket wheels 26, the object of the sprocket wheels being to operate the endless belts 27 which pass around the sides 20 and 21 of the hopper, the important functions of which will be seen from the ensuing description. The lower shafts 25 are considerably longer than the upper shafts 24, the projecting ends being capable of horizontal movement through the bearings 28, which are secured to the upper surface of the baling chamber, and consequently imparting to the feeder 19 a horizontal motion. Rigidly secured to and at a point in proximity to the end of one of the shafts 25 is the gear wheel 29, the object of which is explained hereinafter. The reciprocating plunger head 10, is provided on the upper surface thereof with mechanism for imparting motion to the endless belts 27 and a reciprocating motion to the feeder 19.

Numeral 30 designates a bar which is pivoted to the side 22 of the feeder 19, while its end remote from the pivot has a notch 31. Extending transversely across the plunger head 10 and pivoted to it is the arm 32, while near one edge of the plunger head is situated the perpendicular cam 33. Extending outward from the body of the machine is the frame or guide 34 in which is intended to slide the frame 35 which carries two or more needles 36. At the opposite side of the body from the frame 34 and extending outward therefrom is the frame 37 to which is pivoted the double spring-actuated hooks 38.

The construction and arrangement of the remaining details of my press will be brought forth in the following explanation of the various steps in the operation of baling.

By means of the belt wheel 4 and connecting gears, the plunger head 10 is caused to reciprocate. During the retraction motion of the plunger rod 9, see Fig. 3 the feeder 19 is moved in a direction toward the shaft 3, by means of the staple shaped catch 39 which engages with the notch 31 at the end of the pivoted bar 30. When the feeder 19 has reached the required position namely: directly over the feed opening to the compressor chamber $1^x$, the pivoted arm 32 is caused to travel over the inclined pivoted cam 40, thus raising the arm and consequently causing the bar 30 to be raised and disengaged from the catch 39. When the plunger rod has reached the position shown in Fig. 2 the gear wheel 29 has assumed the position shown in Fig. 2, namely: directly over the gear wheel 41 which is rigidly secured to the end of the horizontal shaft 42, the other end bearing the beveled gear wheel 43 which meshes with a corresponding gear wheel on the main shaft 3. The end of shaft 42 near gear wheel 43 is supported by means of stationary bearing 44, while the other end is supported by the bearing 45 which is pivoted to the support 46 and its free end projecting outward partly over the plunger head 10. Shortly before the plunger head and carrier reach the position shown in Figs. 1 and 2, the pivoted bearing 45 is raised by means of the vertical cam 33, thus elevating the end of the shaft 42 and causing the teeth of the gear wheels 41 and 29 to mesh with each other and thereby communicating motion to the shafts 25 which are connected with each other by means of gear wheels 49. It will be readily seen that by the revolution of the shafts 25 the endless belts 27 are caused to travel, thus forcing hay or straw into the compressor chamber $1^x$, in advance of the plunger head 10. Supposing the motion imparted to the belt wheel 4 to be continuous, the plunger is caused to continue its retraction motion until it reaches the position shown in Figs. 1 and 2 when it begins to travel in the opposite direction until the catch 39 reaches the end of the pivoted bar 30, and simultaneously the vertical cam 33 has passed from beneath the pivoted bearing 45 and the gear wheels 41 and 29 are separated. Consequently the endless belts 27 are caused to remain stationary in relation to the feeder 19. It will be readily seen that as soon as the catch 39 comes in contact with the pivoted bar 30, the feeder 19 is caused to travel longitudinally over the feed opening in the compressor chamber, and the sickle 12 having a continuous reciprocating motion, the hay in the feeder is evenly severed from that in the compressor chamber, while the latter is being compressed by the plunger head 10. In order to disengage the feeder from the plunger head, I have supplied the pivoted cam 50, over which the pivoted arm 32 passes, thus raising the pivoted bar 30 over the catch 39 and allowing the feeder to remain stationary until the operation of compression in the chamber is completed. As soon as the retraction motion of the plunger commences the catch 39 is advanced toward the notch in the end of the bar 30 into which it engages thus causing the carrier to proceed to the position shown in Figs. 1 and 2, when the reciprocation motion described above is repeated.

The operation of forcing the needles between the bales and withdrawing same is I am aware capable of modification, and I do not desire to confine myself to the exact construction and location of the parts herein described.

The finished bale after issuing from the end of the compressor chamber 1<sup>x</sup>, falls by gravity on the tilting table 51 and by means of the pivoted lever 52 and rod 53 the plug 54 is forced upward against the slide 55 which has a slot 56 near one end, thus forcing it upward into the position shown in dotted lines in Fig. 4, and consequently causing the projecting pin 57 on the bottom of the plunger head 10 to engage with the slot 56. The slide 55 engaging with the pin 57 during the contraction motion of the plunger head, is caused to travel in the groove 58 and by means of the wheel 59, pivoted to the bottom of the compressor chamber, and the connecting cord or chain 60 with the slide 55 and similar cord with the end of the sliding frame 35, the needles, through which the wires pass, are forced through the baling chamber, where they are held during the feeding process described above, by the projecting pin 61 which is forced downward into the grooves 62 in the frame 35, by the lever 63 and rod 64 which connect with the shaft 42. As the plunger reaches the position shown in Figs. 1 and 2 the slide 55 has reached the downwardly inclined portion 65 of the groove 62 when it is forced downward, and consequently is disengaged from the pin 57, and by means of the coiled spring 66 which connects the needle frame 35 with the stationary frame 34, the frame 35 and needles 36 are withdrawn from the baling chamber. At the extremity of needles 36 are the grooved pulleys or wheels 67 over which the wire passes after passing through the needles. The hooks 38 which are pivoted one above the other in the frame 37 and are pressed toward each other by means of the springs 68 are intended to spring over the looped wire, thus retaining it as the needles are withdrawn from the chamber, when the wire is severed and bound about the bale.

In Fig. 11 I have represented a modification of the feeder 19, which consists of endless belts encircling the four sides of the hopper, and in Fig. 12 is represented a cross section of a modification of the needles 36, namely: instead of the hollow needles, a bar 69 having a groove 70 with shields or eyes at suitable distances is employed.

I am perfectly aware that instead of the feeder 19 being constructed to reciprocate over the feed opening to the baling chamber, by means of suitable construction the reciprocating sickle may be caused to travel lengthwise of the opening and in this latter case the feeder 19 will remain stationary.

The construction and arrangement of the several parts of my improved continuous press being thus made known, the operation and the advantages of the same will it is thought be readily understood.

I have described the preferred form of construction now used by me; but it will be understood that I intend to cover mechanical equivalents when such are substituted.

Having thus fully described my invention, what I claim, and desire to secure by Letters Patent, is—

1. In a continuous baling machine, the combination, with a compressor chamber and reciprocating plunger of an automatic horizontally movable feeder situated above said chamber, two or more sides of said feeder being formed of continuous traveling belts, arranged to move in inclined planes to form a tapered hopper the object of said traveling belts being to force hay or straw into said baling chamber.

2. In a continuous baling machine, the combination, with a compressor chamber, and reciprocating plunger, of an automatic horizontally movable feeder situated above said chamber, two or more endless belts extending the entire length of opposite sides of said feeder, in an inclined direction the lower edges of said opposite sides of said feeder being in the same horizontal plane, substantially as described and in the manner and for the purpose set forth.

3. In a continuous baling machine the combination, with a compressor chamber, and reciprocating plunger, of an automatic feeder situated above said chamber, two or more sides of said feeder being formed of continuous traveling belts, said feeder having a horizontal reciprocating motion automatically operated releasing devices, and reciprocating severing mechanism, substantially as and for the purpose set forth.

4. In a continuous baling machine, the combination, with a compressor chamber and reciprocating plunger, of a continuously transversely operated sickle situated across the upper surface of said chamber and suitable means for reciprocating said sickle substantially as and for the purpose set forth.

5. In a continuous baling machine the combination with a compressor chamber and a reciprocating plunger, of an automatic horizontally movable feeder situated above said chamber and a sickle situated between said feeder and said chamber and means for reciprocating said sickle substantially as and for the purpose set forth.

6. In a continuous baling machine, the combination, with a compressor chamber and a reciprocating plunger, of an automatic feeder situated above said chamber, and a reciprocating sickle situated transversely across said chamber, one of said parts having a reciprocating motion over the feed opening of said chamber substantially as and for the purpose set forth.

7. In a continuous baling machine, the combination with a compressor chamber and a reciprocating plunger, of an automatic feeder situated above said chamber, said feeder remaining stationary during the process of feeding and traveling across the feed opening of said chamber during the compression process of said plunger and a continuously reciprocating sickle substantially as and for the purpose set forth.

8. In a continuous baling machine, the combination, with a compressor chamber, and reciprocating plunger, of an automatic feeder situated above said chamber, two or more sides of said feeder being formed of continuous belts, said feeder having a reciprocating motion across the feed opening of said chamber, and means for operating said parts, substantially as and for the purpose set forth.

9. In combination with the body of a plunger having a head, an intermittingly reciprocating feeder having elongated shafts at the lower portion thereof and movably mounted in guides, a bar pivotally mounted to one side of the said feeder and provided with a notch at its free end, an arm 32, with which said notched end of the bar engages, a catch 39, a perpendicular cam 33, an inclined pivoted cam 40, and mechanism for operating said parts, substantially as described.

10. The combination of an intermittingly reciprocating feeder having elongated shafts extending from one side of the lower portion thereof, of a bar 30, having an outer notched end, an arm 32 adapted to engage said end, a catch 39, cams 33, and 40, a support 46 having a bearing 45, pivoted thereto, and an inner end adapted to engage the said cam 33, and mechanism for operating said parts, substantially as described.

11. In a continuous baling machine, the combination with a compressor chamber, and a reciprocating plunger, of the herein described reciprocating needle and means for forcing said needles between the bales in said chamber, and an automatic locking device for preventing said needles from being withdrawn from between said bales during the process of feeding substantially as and for the purpose set forth.

In testimony whereof I have signed this specification in the presence of two subscribing witnesses.

FRANK P. FOWLER.

Witnesses:
 CARROLL D. JUDSON,
 GEO. F. KINCAID.